Figure 1B:
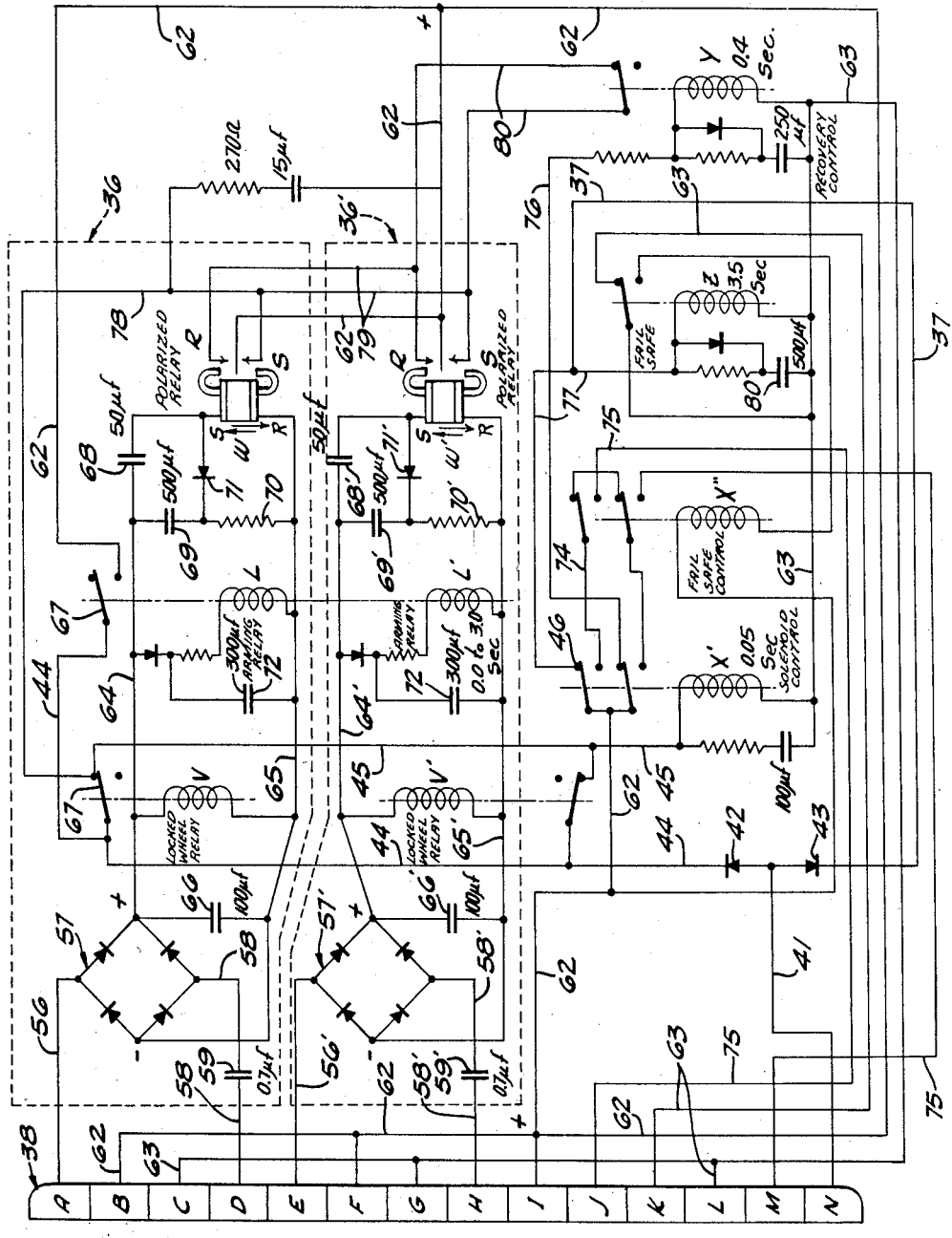

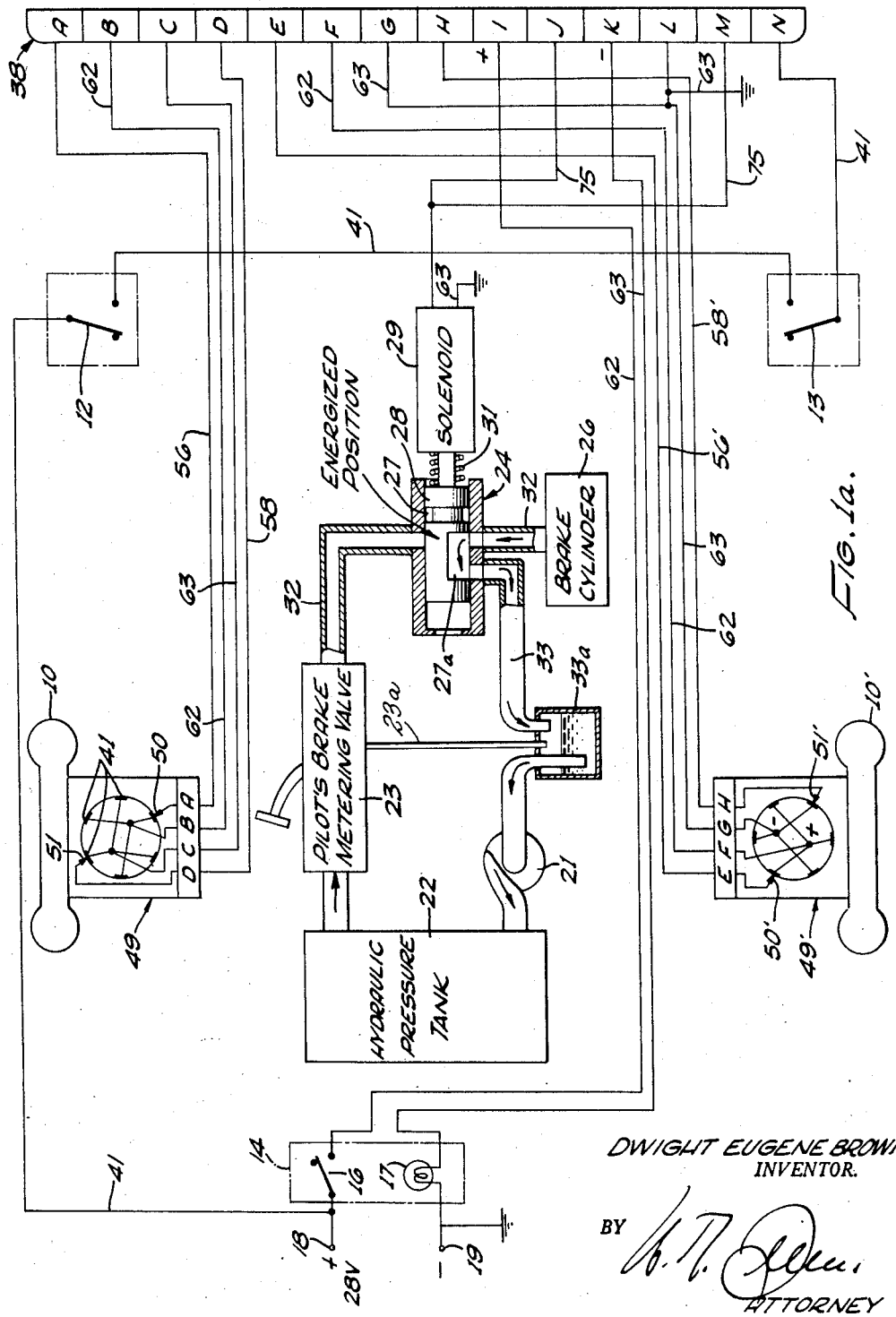

United States Patent Office 2,874,810
Patented Feb. 24, 1959

2,874,810

ANTI-SKID BRAKE SYSTEM

Dwight Eugene Brown, Sherman Oaks, Calif., assignor to Hydro-Aire, Inc., Burbank, Calif., a corporation of California Application April 2, 1956, Serial No. 575,524

17 Claims. (Cl. 188—181)

This invention relates to a decleration control system for aircraft, and more particularly to brake control means for preventing or minimizing the sliding and slipping of the landing wheels during application of the brakes.

It is well recognized that the most efficient and effective method of braking a wheeled vehicle is to apply the maximum friction drag to the wheels without causing the tires to slip or skid on the supporting surface. In practice the achievement of ideal braking automatically has been difficult if not impossible since the correct braking force to the vehicle wheels must vary with the rotational speed and the coefficient of friction between the wheels and the runway. The coefficient of friction varies widely depending on construction materials, temperature and weather conditions. The coefficient of friction also has an important effect on the time required for a non-rotating wheel, as well as an excessively braked wheel rotating at less than the linear speed of the vehicle, to reaccelerate into synchronism with the linear speed of the aircraft. A rotational wheel speed corresponding with the linear velocity of the craft is often called the "synchronous speed" of the wheel. Since the tire is somewhat elastic, it will deflect and slip at the leading and trailing edges of its footprint under severe braking conditions. For this reason, synchronous speed as used in this application will be understood to be the wheel speed at which the major portion of the tire footprint does not slip with respect to the supporting surface as determined by the maximum coefficient developed. It is not necessarily the same as that calculated from the rolling radius of the tire. If an airfield runway is wet or icy, a wheel can easily be locked by application of the brake due to the low coefficient of friction; for the same reason, a locked wheel will require a considerably longer period to accelerate to synchronous speed after release of the brake than under dry runway conditions. The time required for a wheel to recover or accelerate to synchronous speed after excessive braking action is of considerable importance since the brakes are most effective when applied while the wheel is rotating at synchronous speed.

Another feature of importance is the provision of automatic means to assure release of the brakes so long as the landing wheels are out of contact with the ground while airborne or while bouncing in "touching down" on the landing field. The reason for this is that it might be disastrous for a plane to land with locked wheels. And it might be equally serious if the brakes could be applied while the plane is in mid-air during a bounce from the runway.

A further feature of a satisfactory brake control system is the provision of means for deactivating the automatic controls in favor of manual brake control after the craft has been braked to a safe speed for pilot control of the brakes while taxiing and parking the plane.

In view of the above-mentioned desirable characteristics of a satisfactory brake control system for regulating the deceleration of vehicle wheels, it is an object of the present invention to provide a highly effective and compact automatic system for minimizing the slipping and skidding of a tire during braking to achieve the most efficient, effective and safe braking of the vehicle.

A further object is to provide an automatic brake control system having an improved electrical sensing circuit for sensing the rate of deceleration of each braked wheel from its synchronous speed upon brake application and to delay reapplication of the brake until the wheel has reaccelerated to synchronous speed.

A further object is to provide a brake control system in which differentially rated capacitors are employed to measure wheel deceleration and reacceleration rates in combination with means for selectively utilizing these measurements to effect release of the brakes pending recovery of the wheel speed as governed by friction conditions between the wheel and the ground.

A further object of the invention is to provide means for insuring that the aircraft brakes are released during flight without interfering with the availability of the brakes for use by the pilot during normal taxiing and parking operations.

Yet another object is the provision of automatic brake control means employing a separate sensing circuit coupled to each wheel and making use of a multiple coil arming relay having a coil thereof in each sensing circuit and designed to arm or disarm the brake release circuit depending upon whether the sum of all of the wheel speeds is respectively above or below a predetermined speed.

Still another object is the provision of an automatic brake control having means for sensing excessive rates of wheel deceleration and effecting release of the brake for an initial period, and recovery rate sensing means for continuing the brake release period for a further interval where the recovery speed at the end of the initial period is too low for safe reapplication of the brake.

Another object is the provision of an automatic brake control system having means for storing electrical energy in an amount proportional to wheel speed prior to braking, or during normal braking, and utilizing this stored energy in response to excessive deceleration of the wheel to effect release of the brake until the wheel has recovered substantially to synchronous speed.

More particularly it is an object to provide an automatic brake control having a sensing circuit adapted to be energized to a potential proportional to wheel speed together with means for releasing the brake after excessive application thereof by use of energy stored in the sensing circuit until the rising potential level in the sensing circuit indicates the wheel speed has recovered.

A further object is to provide circuit means responsive to the speed of more than one supporting wheel to effect brake release in corresponding pairs on opposite sides of the aircraft when one wheel is decelerating in excess of normal airplane deceleration or is locked against rotation, thereby preventing conditions conducive to ground looping.

These and other objects will become apparent from the following detailed description of an illustrative embodiment of the invention taken in connection with the accompanying drawings, wherein:

Figures 1a and 1b cooperatively constitute a schematic diagram of the hydraulic and electrical control portions of the braking system constructed in accordance with the present invention, the vertically arranged terminal strip to the right of Figure 1a being identical with the strip to the left of Figure 1b for convenience in tracing a circuit between the two figures.

While the braking control system of this invention may be applied to various types of vehicles and to any number of wheels, it will be described below as applied to an airplane with two braked wheels.

In the present specification and claims the term "synchronous speed" is employed to mean a rotational wheel speed corresponding to the optimum braking speed at which the major portion of the tire footprint does not slip with respect to the supporting surface as determined by the maximum coefficient of friction developed. The term "slip" or "slipping" designates a condition in which a wheel is rotating at other than synchronous speed, and is to be distinguished from the term "skid" or "skidding" used to designate a wheel locked against any rotation by the brakes. The term "recovery rate" denotes the rate of rotative acceleration following release of the brakes while the vehicle is in motion.

Essentially the system to be described comprises a rotating commutator associated with each landing wheel with alternate sectors connected to the opposite sides of a constant voltage direct current power source. As each supporting wheel rotates, the commutator brushes are alternately connected to the opposite sides of the line to produce a constant amplitude square wave voltage of a frequency proportional to the rotating speed of the wheel. This variable frequency current is impressed upon a speed sensing capacitor which varies the amplitude of the square wave in accordance with the rotating speed of the wheel. This variable-amplitude square wave is then fed to the opposite corners of a bridge rectifier. The rectifier converts the variable-frequency variable-amplitude square wave to a non-pulsating direct current having a voltage varying with the speed of the wheel. The varying voltage supplied in this manner by each wheel energizes separate but identical sensing circuits for each wheel. Each sensing circuit is operable to control a common bank of relays to release the hydraulic brake associated with each wheel in the event that the pilot is applying sufficient pressure to cause a slipping or skidding condition to occur, and to retain the brake released depending upon various factors governing the safe reapplication of the brake. It is important to note that the pilot has normal control of the brakes up to the point at which an incipient slip or skid condition develops.

The brakes are of the type normally supplied with metered pressurized fluid under the control of the pilot. The sensing circuits provided by this invention act to control a three-way brake release valve downstream of the pilot's brake control valve. This three-way valve closes the pilot's pressure control line to the brake and connects the brake to a bleed line leading from the brake at each wheel back to a sump on the supply side of the hydraulic fluid system thereby rendering the pilot-actuated braking control ineffective while the brake release valve is energized, but restoring the pilot control so long as the bleed valve is de-energized.

Referring to the schematic wiring diagram for the control mechanism as represented by Figures 1a and 1b taken together, it will be noted that the 28 volt direct current supply source is represented at the left end of Figure 1a. Positive and negative wires 18 and 19, respectively, are connected to the main on-off switch 16 and to a signal lamp 17 on the pilot's control panel generally indicated by dot-dash box 14. The positive or "hot" bus 62 and the grounded negative bus 63 extend from supply wires 18 and 19 to terminals I and K, respectively, of terminal strip 38 and to numerous connections in the portion of the circuit shown in Figure 1b. Accordingly, it will be understood that all parts of the system directly connected with positive wire 18 upon the closing of switch 16 are considered as "hot" and are designated 62 in the drawings. Likewise all leads having a direct connection with the negative side 19 of the power supply are designated by numeral 63. For example, power supply busses 62 and 63 extend to positive and negative junctions interiorly of the commutators for each wheel. Inasmuch as terminal strips 38 in each figure are identical and serve only as a convenience in tracing a lead between Figures 1a and 1b, reference to the strips in the description has been omitted for the most part.

The pair of pick-up brushes 50, 51 of the commutator on wheel 10 and brushes 50', 51' on wheel 10' are connected through separate pairs of leads 56, 58 and 56', 58' to the opposite input corners of identical dry plate rectifier bridges 57, 57'. Interposed in each of leads 58, 58' is a speed sensing capacitor 59, 59' each having a rating of 0.7 microfarad, hereinafter abbreviated to $\mu f$. The function of capacitors 59, 59' is to vary the amplitude of the voltage input to the rectifier bridge in proportion to the rotational speed of its associated wheel.

The commutators on the wheels are thus seen to cooperate with the speed-sensing capacitors 59, 59' and the rectifier bridges 57, 57' to energize the respective sensing circuits 36, 36' with a direct current voltage proportional to the speed of the wheel to which it is connected. The initial voltage imposed on the two principal leads 64, 65 of the sensing circuits will be high due to the high speed of the wheels soon after the plane "touches down" on the landing field. The resulting high voltage imposed on the sensing circuit will charge the various capacitors and energize each of the relays V, L and W. Two of the capacitors are of particular importance because the energy stored by them is utilized upon excessive braking to effect release of the brake until the wheel has recovered its synchronous speed. This release is accomplished by energizing relays controlling a power circuit for a brake release solenoid.

This brief summary of the control system will serve as a basis for a detailed description of the components illustrated schematically in Figure 1b.

*The sensing or detector circuit*

The identical sensing or detector circuits for each wheel are shown in Figure 1b as enclosed in dotted line boxes 36 and 36'. For convenience, these circuits will be referred to below as sensing circuit 36 or 36'. A description of upper circuit 36 will be understood as applying equally to both, and the corresponding parts of each will be designated by the same numeral or letter distinguished by a prime.

The sensing circuit includes three relays V, L and W connected in parallel across positive lead 64 and negative lead 65. These leads are connected to the output side of bridge rectifier 57 which energizes them with continuous direct current having a voltage varying in proportion to the rotational speed of wheel 10. The maximum possible voltage is 28 volts when using a 28 volt power supply, and varies from this value to zero under locked wheel conditions. Any tendency for "rippling" resulting from the operation of the rectifiers is corrected by the 100 $\mu f$. smoothing capacitor 66 connected across the bridge output terminals in advance of the sensing relays.

Relay L is known as the arming relay since its activation is required to close switch 67 thereby "arming" the contacts of the locked wheel control relay V. As will be explained in detail presently, relay V supplies power to the brake release solenoid control circuit immediately upon the wheel speed falling below 10 M. P. H. if armed by the L relay. Arming relay L has as many coils as there are wheels and associated sensing circuits, but only a single armature common to all coils and a single switch 67 controlled by this armature. Accordingly, in the present control for two wheels, the arming relay has one coil L connected across sensing circuit 36 for wheel 10, and a second coil L' across sensing circuit 36' for wheel 10'. The single armature is indicated by the dotted line extending through both coils and the switch 67 controlled by the relay. It will therefore be understood that the position of the armature and switch is controlled by the sum of the variable voltages applied to the sensing circuits. To illustrate, the arming relay is designed to close switch 67 only when the combined speeds of both wheels exceeds 20 M. P. H., or if one wheel is rotating at a speed greater than 60 M. P. H. Thus, one wheel may be locked against rotation, but the arming relay switch will remain closed if the other wheel speed is greater than 60 M. P. H.

A 300 μf. capacitor 72 is connected across the L relay coil and discharges through the coil to keep switch 67 closed for a preselected time period as, for example, 3.0 seconds following very rapid wheel deceleration. During normal braking and deceleration, capacitor 72 discharges as the wheel speed drops, and relay L opens as the plane speed falls below 10 M. P. H. This allows the brake to remain "on" in a parked condition with the wheels locked. But during excessive braking resulting in wheel slip, relay L remains energized to assure a power supply to the V relay coil for a limited interval after the wheel speed falls below 10 M. P. H. At the end of this interval, the V relay is disarmed but in the interim the slipping condition will have been corrected by the release control valve and the application of the brake is placed under the sole control of the pilot through the conventional manual brake control facilities. For all combined wheel speeds in excess of 10 M. P. H., switch 67 will remain closed and the locked wheel relay V is armed in readiness to effect release of the brake should the wheel suddenly become airborne during a bounce condition or strike icy or slippery footing and lock.

Relay V is known as the locked wheel control relay, and is energized by voltages representing wheel speeds in excess of 10 M. P. H. to open the 28 volt D. C. power circuit to the solenoid control relay X'. The contacts of the V relay are closed when the wheel is locked or slowed to a rotating speed of 10 M. P. H. in order to initiate immediate release of the brake until the wheel has reaccelerated or until the "skid" contact of the W relay has closed. It will be observed that the center contact of relays V and V' are connected by a lead 44 which also extends to the center contact of switch 67 of the arming relay L. The other contact of arming switch 67 is connected to the positive bus 62 of the power supply, while the other contacts of the two V relays are interconnected by a lead 45 extending to the coil of relay X'. Relay X' is activated whenever the system is armed and either of the locked wheel control relays V or V' is deactivated as a result of the speed of an associated wheel falling below 10 M. P. H., as will be explained more fully below.

The W relay is of the polarized type and its switch contactor tilts in one direction or the other depending on the direction of current flow through its coil. Accordingly, this relay is sensitive to both voltage and the direction of current flow whereas all the others are sensitive to voltage changes. The W relay is known as the skid control relay and is in a neutral position except when there is a current flow of a certain magnitude through its coil. When current flows downwardly through the coil, as indicated by arrow R, its recovery contact marked R closes. When the current flow through the coil is upwardly, as indicated by arrow S, the contact marked S closes.

The direction of current flow in the W or skid control relay is controlled by a pair of capacitors 68 and 69. The "recovery rate" capacitor 68 has a capacity of 50 μf., while "skid rate" capacitor 69 has a capacity of 500 μf. and is connected to lead 65 through a resistor 70. A rectifier or gate means 71 is connected across the two capacitors and confines the flow of current during discharge and recharging of the capacitors to desired paths in the W relay circuit as will be explained more fully presently. It will be noted that a number of dry plate rectifiers are provided in the control circuit as a whole and operate to isolate the various time delay circuits from one another as well as to confine the current flow as desired. The series connected 270 ohm resistor and the 15 μf. capacitor connected across leads 62, 78 at a point between the W relay contacts are merely for arc suppression.

*The power circuit relays*

Relays X', X'', Y, Z and solenoid valve assembly 24 are the components making up the remainder of the automatic control circuit for releasing the brake. Each of these components is connected in the main D. C. power circuit through switch contacts controlled by each of the sensing circuits and by the pilot's manual switch 16. Each component will be described briefly preliminary to a step-by-step description of the mode of operation under various landing conditions.

The two solenoid control relays X' and X'' are of similar construction. Relay X' is bridged by a 100 μf. capacitor to provide a very brief time delay of 0.05 second in the opening of the double set of contacts controlled by this relay. Brief as this interval is, it keeps the X' contacts closed and the brake solenoid energized during the time of transfer from "skid" to "recovery" of the W relay and during the reversal of current flow through the W relay. While energized by the cooperative action of the sensing circuit relays V, L and W, relay X' is effective to connect the main power bus 62 to leads 74, 75 and energize the brake release solenoid 29. Note that the opposite side of solenoid 29 is connected to negative power bus 63. If the wheel skid is of unusual duration, that is, longer than a predetermined time delay period for the opening of the Y relay, for example 0.4 second, then relay X' and associated parts of the control circuit function to keep the brake solenoid energized until the wheel speed has recovered to synchronous speed. It will therefore be understood that the Y relay participates in holding the brake released during skid periods exceeding 0.4 second. In the event the "skid signal" is less than 0.4 second, the departure from synchronous speed will be small and the hydraulic pressure is applied when the "skid signal" ends. The X' relay is also operative to energize the brake release valve, as during locked wheel conditions when the plane touches down on ice for example, and these will be explained in detail in connection with specific operating situations.

The X'' relay is conveniently termed a "fail-safe" solenoid control relay and must be activated by the Z relay to complete the power circuit from the hot bus 62, lead 74, lead 75 to the brake release, and solenoid 29 to negative bus 63. Consequently, it will be evident that the opening of the Z relay contacts will open the power circuit for the X'' relay and disrupt the power supply for the solenoid. Since the power supply for the Z relay coil is opened each time relay X' is energized to release the brake, it is desirable to provide means for holding the Z contacts closed for a time period in excess of that required for the wheel to recover to synchronous speed. This is done by connecting a 500 μf. capacitor 80 across the Z coil to hold the relay contacts closed and relay X'' activated for a time delay period of approximately 3.5 seconds. This means that the brake release solenoid cannot be energized for a longer period than 3.5 seconds and provides positive means for deactivating the entire automatic control should one of the relays stick or malfunction in a manner to keep the brake release solenoid energized.

Relay Y is known as the recovery control relay and is activated only when the solenoid control relay X' is de-energized. When X' is de-energized, its lower contactor is in the position illustrated and supplies power from hot bus 62 through lead 76 to the top side of relay Y to energize it. Note that the lower side of the Y coil is connected to ground bus 63. A 250 μf. capacitor is connected to discharge through the Y relay coil to hold the associated contactor open for a time delay period of 0.4 second following the activation of relay X'. If X' remains activated longer than 0.35 second, this period plus the 0.05 second time delay period of the X' relay will exceed the 0.4 second delay characteristic of the Y relay. Accordingly, the Y contact will close thereby rendering the recovery contact R of the W relay effective to supply 28 volts D. C. to relay X' to release the brake and allow the wheel to accelerate toward synchronous speed. This function of relay Y is to prevent brake application while the wheel is critically below non-skid speed as will be explained more fully below.

Relay Z is called a "fail-safe" relay since it operates to energize pilot lamp 17 and to retain the normal manual braking system in operation in the event of malfunctioning of the automatic deceleration brake control. Relay Z can be activated either by way of the oleo or squat switches 12 and 13 located in the landing gear struts, or by way of the upper contacts of relay X'. The first of these two current supply circuits includes a lead 41 connected to the positive side 18 of the power supply, the two oleo switches 12, 13, a common lead between a pair of dry plate rectifiers 42, 43, and leads 37, 77. The second supply includes the positive bus 62, the upper contact of relay X', and lead 77. In each instance, the lower side of the Z relay coil is connected to negative bus 63. Since the two current supply circuits described above for the Z relay are connected to the opposite ends of the main power supply switch 16, it will be clear that, under flight conditions, provision is made for the energization of the Z relay irrespective of the position of switch 16 with the result that this relay is supplied with power irrespective of whether the pilot remembers to close switch 16. Should the plane touch down on the runway, switches 12 and 13 open and relay Z is then dependent on the position of the X' relay contacts for its power supply, as will be explained more fully below.

The Z relay includes a 500 μf. capacitor for holding the relay energized for 3.5 seconds thereby maintaining the X'' relay energized for that period after X' has disrupted the power supply to the Z relay. This delay action enables Z to maintain the power supply to X'' for a reasonable period of time and then disarms the brake release solenoid power supply. This prevents a sticking relay or some other malfunctioning portion of the automatic control from energizing the brake release solenoid indefinitely. An indication of failure is shown on the pilot's panel by the light 17, which is energized by the upper contact of the Z relay whenever this relay is de-energized.

*Operation in flight*

Assuming that the plane on which the system is installed is in flight, the pilot controlled switch 16 on panel 14 will be closed to supply a 28 volt D. C. current to the hot bus 62. This bus leads to a junction interiorly of each commutator and to the center contacts of relay X'. Another lead 41 supplies power from hot bus 62 to oleo switches 12, 13 associated with each landing wheel strut and closed when the plane is airborne. Hence, the closed oleo switches supply power through leads 41, 37 and 77 to energize the Z relay closing its contact downwardly to complete a power circuit from hot bus 62 through relay X'' to ground bus 63, thereby closing the X'' relay contacts downwardly. Since the landing wheels are not rotating in flight, both V relays are de-energized and the closed oleo switches are effective to supply power through lead 44, the V relay contacts, and lead 45 to activate relay X', closing the latter's contacts downwardly. Current then flows through leads 62, 74 and 75, to solenoid 29 and to ground bus 63 to open the brake release valve and prevent the application of the brakes owing to the fact that the brake cylinders 26 are vented through conduits 32, 33 and valve member 28 to sump 33a. It will therefore be recognized that the brakes cannot be applied while the plane is airborne, thus providing a positive safeguard against touching down on the runway with the brakes applied.

It will be understood from the foregoing explanation that during flight relay X' remains energized and its contacts are closed downwardly. Under these conditions the power supply to the Y relay is broken and its contact remains closed upwardly. Should a power failure occur for any reason, the "fail-safe" relay Z will be de-energized (after the 3.5 second period required to discharge the 500 μf. condenser) and the resulting upward closing of its contact will light pilot lamp 17 and deactivate relay X'' thereby opening the circuit for the brake release solenoid 29. The lighting of lamp 17 gives the pilot notice that the automatic deceleration control system is not functioning and that the plane must be controlled by the "normal" or manual control mechanism. It will be understood that the automatic portion of the present brake control system intervenes only if the pilot-controlled brake is applied excessively hard to skid the wheel and/or lock it against rotation, as will be explained in detail below under specific operating conditions.

The hydraulic braking system has only been indicated diagrammatically inasmuch as the braking system by itself is not a part of this invention and it is well known in the prior art. It will be understood that pressure pump 21 is operable to withdraw brake fluid from sump 33a and deliver it under pressure to hydraulic fluid pressure tank 22. Conduits 32 are provided for delivering this pressurized fluid to brake cylinders 26 associated with each wheel under the control of the pilot-operated brake metering valve 23 and of the solenoid-controlled three-way valve 24. Brake metering valve 23 will be understood as including the usual means such as conduit 23a for returning excess fluid back into the system by way of sump tank 33a. The latter has a pair of passages 27, 27a in movable member 28, passage 27 being aligned with conduits 32 when solenoid 29 is de-energized, and passage 27a providing a fluid connection between conduits 32 and 33 when the solenoid is energized thereby venting brake cylinder 26 to sump tank 33a.

*Landing on dry runway*

Assuming that the plane is in flight ready to land and that the pilot's manual control switch 16 is closed to supply power to the landing wheel commutators and to control relays X', X'' and Z, the operation during landing on a dry runway is as follows. A dry runway would normally have a high coefficient of friction. Consequently, excessive application of the brakes by the pilot would cause skidding of one or both wheels. The squat or oleo switches 12 and 13 are preferably so designed that they open when approximately five to ten percent of the full weight of the plane is supported by the wheels. So long as the aircraft wheels are off the ground or so long as less than about ninety percent of the aircraft weight is supported thereby, the oleo switches will remain closed to supply current to energize the X' relay and the brake release solenoid 29 thereby providing a positive safeguard against touching down on the runway with the brakes applied. While closed, the oleo switches allow current to flow through rectifier 42 and lead 44 to the closed contacts of the V relays from which the current passes by way of lead 45 to the X' relay coil and thence to the negative bus 63. Once the wheels touch down, they pick up rotational speed very rapidly even though only a part of the aircraft weight is supported by them. As the wheels begin to rotate, the sensing circuits 36, 36' are energized and the rotation sensing V relays act to open their contacts as the wheel speed reaches 10 M. P. H., thereby interrupting the current supply to the X' relay and de-energizing brake release solenoid 29. It will be understood that this de-energization of the brake solenoid occurs regardless of the degree to which the craft weight is supported by the landing gear and solely in response to the speed of the wheels as sensed by the respective V relays. If the plane bounces with the brakes applied, the V relays will become de-energized to restore the current flow to relay X' and effect release of the brakes by energizing solenoid 29 in the manner described above until such time as the wheels again touch down and reach a rotating speed of 10 M. P. H. or greater. Upon being energized, solenoid 29 is operative to shift valve 28 in opposition to spring 31 to the position illustrated in Figure 1a wherein brake cylinder 26 is vented to the sump tank 33a by way of conduits 32, 33 and the horizontal passage in valve 28.

The specific manner in which the various components of the deceleration control of this invention function during the initial touch down and subsequent phases of the landing operation is as follows. Owing to the high surface coefficient of friction for dry runway conditions, the wheels accelerate in an extremely brief interval and usually before the oleo switches open. This wheel rotation causes commutators 49, 49' in cooperation with capacitors 59, 59' to supply a square wave voltage of variable frequency and amplitude to bridge rectifiers 57, 57'. These in turn energize the sensing circuits with a direct current voltage proportional to the speed of the associated wheel. Since the operation of the sensing circuits are identical and controlled by the signal received from their respective wheels, only the operation of circuit 36 for wheel 10 will be described, it being understood that the same explanation applies to circuit 36'. As soon as the wheels rotate above 10 M. P. H., the locked wheel relay V is energized to open its previously closed contactor. At substantially the same instant, arming relay L is energized to close switch 67 to arm the center contact of the V relay by connecting it to the positive bus 62. The recovery rate sensing capacitor 68 and the skid rate sensing capacitor 69 connected in parallel with the W relay coil and across sensing circuit power leads 64 and 65 become charged to a voltage proportional to the wheel speed.

Let it be assumed that the brake is applied excessively to wheel 10 by the pilot opening brake fluid metering valve 23 to allow pressurized hydraulic fluid to flow from a supply tank 22 to brake cylinder 26, this flow taking place through duct 32 and a passage 27 in valve 28 controlling flow therein. Normally, brake release solenoid 29 is de-energized, and spring 31 is effective to hold valve 28 to the left of the position illustrated so that passage 27 is aligned with duct 32.

The high coefficient of friction prevents as rapid deceleration of the wheel as would occur on a slippery runway, but the undesirably high deceleration rate following excessive brake application causes an immediate and proportional drop in the voltage applied across leads 64, 65 of the sensing circuit. The charge present on capacitors 68 and 69 as deceleration of the wheels starts represents stored electrical energy which begins to discharge into the sensing circuit by way of lead 64, the V relay, lead 65, then in parallel through resistor 70 and the coil of the W relay and rectifier 71. This upward flow of current in the W relay coil closes skid contact S and completes a power circuit from bus 62, the relay contactor, and through leads 79, 78, 45 to the coil of relay X' thence to grounded bus 63. The activation of relay X' closes its contacts downwardly to supply power from bus 62 to leads 74, 75, solenoid 29 and ground bus 63, thereby shifting valve 28 to the position shown in Figure 1a wherein the braking fluid can escape from brake chamber 26 to sump 33a by way of conduit 32, 33 and valve 28. The release of the brake allows the wheel to re-accelerate to synchronous speed very quickly and before capacitor 69 becomes fully discharged. The reacceleration restores the voltage level in the sensing circuit and recharges the capacitors. As this recharging begins, the discharge current flow through the W relay ceases and the skid contact S opens to de-energize relay X', allowing spring 31 to shift the brake release valve to the left and restore the brake to manual control. A short time delay is involved before the brake can be reapplied due to the time required for the brake pressure to build up.

During this period, capacitors 68 and 69 are recharging in a reverse direction to that described for the discharge phase of the cycle.

In recharging, the main current flow to the larger capacitor 69 is downwardly through resistor 70 rather than through the relay coil by reason of the blocking action provided by rectifier 71. The charging current for the recovery rate capacitor 68 does flow downwardly through the relay and may be strong enough to close the contactor to the R contact. However, should this occur it will have no effect on relay X' because the skid cycle for dry runway conditions is always shorter than the time delay period of 0.4 second required for the Y relay contact to close and render the R contact effective to again close the brake release circuit. But this is immaterial since the wheel recovers to synchronous speed very quickly on a dry runway.

On dry runways the pilot may sense the effectiveness of the braking and control the application of the brakes accordingly. If the brakes are properly applied, there is no sudden voltage decay in the sensing circuit in which event the skid rate sensing capacitor is not called upon to supply stored energy to effect closing of the skid contact S to energize relay X' and the brake release solenoid. But when the sum of the wheel speeds falls below 20 M. P. H. representing a plane speed of 10 M. P. H., the arming relay L opens to disarm the V relay contacts and return the control of the brakes solely to the pilot and the manual control system. The pilot thus has parking brakes despite the closing of the V relay contact since the power supply to this contact has been disconnected by the arming relay.

*Landing on a wet or icy runway*

Let it next be assumed that the plane is landing on a wet or icy runway having a low coefficient of friction. If, under these circumstances, the brakes are applied excessively as the plane touches down, or is traveling at high speed along the runway, the wheels will decelerate very quickly as the brakes are applied and will likely lock instead of merely decelerating to a speed considerably below the linear speed of the plane as they do on a dry runway. Furthermore, unlike dry runway landing conditions, one wheel may lock or go to zero speed while the other may decelerate much more normally. In either event, the excessive and extremely rapid deceleration or locking of wheel 10, for example, results in the complete collapse of the voltage signal to sensing circuit 36. This causes the locked wheel relay V to de-energize and close its contact thereby supplying power from bus 62 through arming switch 67 of the L relay to lead 45 and energize relay X' and brake release solenoid 29 to release the brake on the locked wheel. The L relay is closed despite the locking of wheel 10 because of the delaying action of capacitor 72 on this relay. The relay would also remain closed if wheel 10' is operating at a speed of 60 M. P. H. or more. Upon release of the brake for wheel 10, the skid rate and recovery rate capacitors begin discharging stored energy into the sensing circuit as described above, the discharge current of capaictor 69 flowing upwardly through coil W to close skid contact S and continue the release of the brake despite the opening of the V relay contact as the wheel accelerates above 10 M. P. H.

During the initial phase of the reacceleration phase, the wheel may be only partially up to synchronous speed as the rising voltage signal from the commutator equals the falling voltage of discharging capacitor 69. At this instant there is no current flow in the W coil and the S contact will open to de-energize relay X'. However, the time delay constant of 0.05 second of the X' relay provided by its 100 μf. capacitor is sufficient to keep the brake release solenoid energized until the charging current for recovery capacitor 68 begins flowing downwardly through coil W to close recovery contact R. This contact remains closed while the wheel continues to recover speed to recharge the capacitors 68 and 69, it being recalled from the discussion of dry runway operations that during recharging, the recharging current for 68 is restricted by rectifier 71 to flow downwardly through coil W to hold the brake released until the recovery rate sensing capacitor becomes charged. As capacitor 68 becomes charged, the recharging current flow ceases and contact R opens to deactivate the brake release solenoid.

The importance of the roles played by the two sensing capacitors will be appreciated from the fact that, during short skid periods, the skid sensing capacitor is effective to release the brake until synchronous speed is reached even though the wheel should lock, but during long skid periods the recovery sensing capacitor takes over for the latter portion of the recovery period and is effective to continue the brake release until synchronous speed is achieved. If a wheel has only recovered to substantially synchronous speed when the capacitors cease discharging, it would obviously be imprudent to permit reapplication of the brake. But with the arrangement provided here, the recovery rate capacitor 68 acts in the manner described to keep the brake released until the wheel has recovered to synchronous speed.

If subsequent brake applications do not cause excessive wheel deceleration, the skid cycle operation may well be of sufficient duration to permit recovery of wheel speed. If this occurs within 0.4 second, relay Y will remain energized and render the R contact of the W relay ineffective to prolong the brake release since there is no necessity for such release.

The operation of the arming relay and locked wheel control relay V during the final phase of the landing operation is the same as described above under dry runway operating conditions.

Another important capability of the present control is that of effecting release of the brakes immediately following touch down on ice or on an unusually slippery runway. In such cases the wheels undoubtedly will not accelerate to any appreciable extent before brake application with the result that the sensing circuits are only partially energized. But this partial energization suffices to actuate the arming relay to close the power supply to the locked wheel control relays V and V'. By virtue of capacitors 72, 72' in circuit with the arming relay coils, the V relays are kept armed for a period up to 3.0 seconds after the wheel or wheels lock to keep the brakes released until the wheels have had an opportunity to reach synchronous speed. It will therefore be appreciated that the V relays perform a very important function under these particular operating conditions.

From the foregoing it will be understood that it is immaterial to the operation of the brake control whether one or both wheels are skidding on the slippery runway. Thus, both of the sensing circuits are connected in parallel with the X' relay and other power circuit control relays, and each sensing circuit is operable to control the brake associated therwith in such a way as to render the pilot control ineffective so long as either wheel is skidding or slipping at an undesirable rate.

It is to be understood that the ratings of the resistors and capaictors, the drop out speeds of the V and L relays, the voltages employed, etc., specified above by way of example may be varied to obtain different operational periods for the components without departing from the principles or spirit of this invention.

While the particular brake control system herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. An automatic wheel brake control system of the type having an automatic brake release control for overriding a manual brake control upon excessive application of the brake, said system including manually controllable brake means, release means operable to release said brake means independently of the manual control therefor, and electrical means actuatable by the rotation of the braked wheel for actuating said release means, said electrical means including a variable voltage signal generator adapted to be driven by said wheel, a sensing circuit connected to be energized by said generator and including means for storing electrical energy from said generator, means in said sensing circuit for sensing a locked wheel condition and connected to said brake release means and operable to release said brake in response to the locking of said wheel, and means operable by stored energy derived from said energy storing means to hold said brake released while said wheel is regaining speed and while the energy drained from said energy storage means is being replenished.

2. An automatic wheel brake control system of the type having an automatic brake release control for overriding a manual brake control upon excessive application of the brake, said system including manually controllable brake means, release means operable to release said brake means independently of the manual control therefor, and electrical means actuatable by the rotation of the braked wheel for actuating said release means, said electrical means including a variable voltage signal generator adapted to be driven by said wheel, a sensing circuit connected to be energized by said generator and including a pair of electrical energy storing means of different capacity arranged to be charged from said generator, a polarized relay in circuit with said energy storing means, said energy storing means being operable to energize said relay selectively in different directions depending upon the direction of current flow through said relay from said energy storing means, means connected to said energy storing means and to said relay for determining the discharge of said energy storing means through said relay depending upon the direction of current flow therethrough, and means including a power circuit connected between said relay and said brake release means operable to activate said brake release and release the brake when current flows through said relay in one direction from said energy storing means and operable when current flows through said relay in the opposite direction from a portion only of said energy storing means to maintain said brake released for a substantially longer period normally adequate for said wheel to reaccelerate approximately to synchronous speed.

3. In an automatic wheel brake control system, the combination in electrical circuitry; of a sensing circuit coupled to direct current commutating means rotating with a wheel to be braked including means for translating the output of said commutating means to a voltage signal proportional to wheel speed, a power circuit including brake release means, control means in said power circuit for activating said brake release including a polarized relay in said sensing circuit, a pair of energy storage means of different capacity in said sensing circuit adapted to be charged from said commutating means and including means for determining the discharge of said energy storage means depending on the direction of current flow through said polarized relay to activate said brake release, both of said energy storage means being effective to activate said brake release depending upon the direction of current flow, only one of said energy storage means being effective to continue the period of brake release, said continuation of brake release being dependent upon the rate of wheel speed recovery following release of the brake.

4. A wheel brake control system as defined in claim 3 characterized in the provision of manual means for operating the wheel brake, first and second relay means in said power circuit, said first relay means being connected with said polarized relay and operable to arm the power circuit and to deenergize said second relay means, said second relay means deenergizing said power circuit after a predetermined period, whereby the effectiveness of said manual brake control means is restored notwithstanding the operating condition of said commutating means and of the sensing circuit energized thereby.

5. In an automatic wheel brake control system having a ground contacting wheel adapted to drive a direct current commutating means to produce a variable frequency square wave, means for converting said square wave to direct current having a voltage proportional to wheel speed, a manual brake control for braking said wheel, an automatic brake release for deactivating said manual control during excessive braking, said brake release including a normally open power circuit, a sensing circuit connected to and energized by said variable voltage direct current and including energy storing means arranged to be charged with energy during periods of wheel acceleration, and relay means in said power circuit activated by said stored energy during periods of excessive wheel braking and operable to activate said brake release to permit said wheel to reaccelerate.

6. An automatic wheel brake control system as defined in claim 5 characterized in that said square wave converter means includes a semi-conductor bridge connected across said commutating means through a capacitor and cooperating therewith to convert said variable frequency direct current square wave into direct current having a voltage proportional to wheel speed.

7. In an automatic brake control system for use in over-riding a manual brake control instantly that over-braking results in excessive deceleration of the braked wheel, said system being of the type including a manually operated brake control for a wheel, brake release means for deactivating said manual control, a speed sensing circuit connected to and operable to activate said brake release means when the speed of the wheel falls sufficiently abruptly to indicate over-braking by said manual brake control; that improvement in said brake control system comprising means for energizing said sensing circuit with a voltage which varies proportionally to wheel speed and including in combination direct current commutating means driven by the braked wheel and producing a square wave direct current having a frequency varying with wheel speed, a rectifier bridge connected across said commutating means through a capacitor and cooperable therewith to convert the commutator output to direct current having a voltage proportional to wheel speed, and means connecting the output of said rectifier bridge to said sensing circuit to energize the same.

8. An automatic brake control system as defined in claim 7 characterized in that said system includes a plurality of wheels arranged to be manually braked in unison by said manual brake control, each of said wheels having an associated speed sensing circuit and commutating and converter means for energizing its speed sensing circuit with direct current voltage proportional to wheel speed, and common power supply means interconnecting each of said sensing circuits with said brake release means and, whereby said brake release means is activated through said power supply means when the rate of voltage change in any one of said sensing circuits indicates over-braking of the wheel associated with that speed sensing circuit.

9. An automatic brake control system as defined in claim 8 characterized in that each of said speed sensing circuits includes a pair of energy storing means in combination with a polarized relay and a semi-conductor so connected as to activate said relay in one direction to activate said brake release means when the voltage across said sensing circuit falls at an excessive rate and also operative to close in the opposite direction to maintain said brake release activated for a brief additional period measured by the period required substantially to restore the energy level of one of said energy storing means.

10. In an automatic brake control system for a plurality of wheels, the combination including separate speed sensing circuits adapted to be coupled to direct current commutating means driven by each wheel to be braked and including means for energizing each sensing circuit with direct current having a voltage proportional to the speed of the associated wheel, a manual brake control for said wheels, over-riding brake release means and a power circuit for activating said brake release means, each of said sensing circuits including a locked wheel relay, an arming relay common to all of said circuits operable to arm said brake release power circuit when the sum of the wheel speeds exceeds a predetermined value, a polarized relay including a pair of energy storing means in each of said sensing circuits, one of said energy storing means being operable to discharge through said polarized relay in response to an excessive decrease in the associated wheel speed to close said polarized relay thereby activating said brake release, the other of said energy storing means including gate means cooperable therewith to activate said polarized relay in the opposite direction as the excessively braked wheel regains speed and being operable to maintain said brake release activated while said braked wheel recovers substantially to synchronous speed.

11. In combination with a manually controlled wheel braking system for a plurality of wheels, an automatic brake release operable to deactivate said braking system temporarily independently of said manual braking system, said automatic release means including an electrical sensing circuit for each wheel and separate signal generating means driven by each wheel being braked connected to energize a particular one of said sensing circuits with a signal voltage proportional to wheel speed, a power circuit for said brake release, arming relay means connected in circuit with each of said sensing circuits and operable when the sum of the wheel speeds exceeds a predetermined value to arm said power circuit for said brake release means and to disarm said power supply at lower aggregate wheel speeds, circuit breaker means in said power circuit, and decelerating wheel speed sensing means in said sensing circuit responsive to changing signal conditions in said sensing circuit and operable to close said circuit breaker means to release said manual brake in response to abnormally rapid wheel deceleration indicative of excessive manual brake application.

12. In an automatic wheel brake control system for a plurality of aircraft wheels, the combination comprising normally deactivated brake release means for said wheels, a power circuit, means responsive to rotating wheel conditions of each wheel to generate independent signals, separate locked wheel relay means responsive one to each of said signals and operative to close said power circuit to energize said brake release means at or near locked wheel conditions, means for storing said signal energy, relay means activated by said stored energy to operate said brake release means through said power circuit, and an arming relay in said signal circuit operable when the sum of the individual wheel speeds exceeds a predetermined value to arm the power circuit for said brake release means and operable to disarm said power circuit at aggregate wheel speeds below this predetermined value, whereby said brake control system is operable to release the brake on a wheel which locks before said wheel has accelerated to synchronous speed due to touching down on a slippery runway.

13. A brake control system as defined in claim 12 characterized in that said relay means is polarized, and in circuit with said relay means is a second means for storing signal energy simultaneously with said first mentioned energy storing means, rectifier means in circuit with said second energy storage means and relay means operable to utilize re-charging of said second energy storing means to maintain said armed brake release power circuit activated during a period of wheel speed recovery following braked wheel braking until said locked wheel has reaccelerated substantially to synchronous speed.

14. In an automatic wheel brake control system for a plurality of wheels, the combination comprising normally deactivated brake release means, a power circuit for said brake release means having an arming switch therein, means responsive to rotating wheel conditions of each wheel to generate separate brake release signals, separate relay circuits connected to and energized by signals from an associated one of said wheels, said relay circuits each including a locked wheel relay and an associated energy storage means, said wheel generated signals being effective to charge said energy storage means and to activate said locked wheel relay to maintain said power circuit switch closed at wheel speeds near locked wheel conditions and open at higher wheel speeds, an arming relay coil common to all of said relay circuits and including means for holding said arming relay coil energized for a time interval after the predetermined aggregate speed of said wheels falls below the speed required to energize the arming relay, time delay means operable to close said arming switch so long as the sum of the wheel speeds exceeds a predetermined speed higher than the speed at which said locked wheel relays open, deceleration-sensitive relay means including said energy storing means in each of said relay circuits operable to close said armed power circuit to activate said brake release upon deceleration of an associated one of said wheels due to excessive braking, said deceleration-sensitive relay utilizing energy derived from the last mentioned energy storing means.

15. A brake control system as defined in claim 14 characterized in that said time delay means for said arming relay is operable to maintain said arming relay energized to arm said power circuit for a period not substantially in excess of three seconds.

16. In an automatic brake control system for a plurality of wheels, the combination including separate speed sensing circuits adapted to be coupled to direct current commutating means driven by each wheel to be braked and including means for energizing each sensing circuit with direct current having a voltage proportional to the speed of the associated wheel; a manual brake control for said wheels having normally deactivated brake release means; said speed sensing circuits each including locked wheel control relay means, an arming relay common to all speed sensing circuits for arming said brake release means, and polarized relay means including means operatively connecting the same to activate said brake release means, a plurality of sensing means connected to activate said polarized relay means in one direction in response to over-braking of the associated wheel, a rectifier in circuit with said sensing means in such manner that only one of said plurality of sensing means activates said polarized relay in the opposite direction following an increase in the volatge signal to said speed sensing circuit after the activation of said brake release to maintain the brake release activated for a brief period while the released wheel is recovering substantially to synchronous speed.

17. An automatic brake control as defined in claim 16 characterized in that said arming relay includes a plurality of coils one of which is in a different one of said sensing circuits and having an armature operated arming switch common to all of said coils, said arming relay being responsive to the sum of the wheel speeds to maintain said switch closed so long as the sum of the wheel speeds exceeds a predetermined rate.

References Cited in the file of this patent

UNITED STATES PATENTS

| | | |
|---|---|---|
| 2,256,287 | McCune | Sept. 16, 1941 |
| 2,663,521 | Yarber | Dec. 22, 1953 |
| 2,753,017 | Curl et al. | July 3, 1956 |
| 2,788,186 | Wilson | Apr. 9, 1957 |
| 2,799,462 | Steigerwald | July 16, 1957 |